Nov. 20, 1928.  R. E. WOLF  1,692,605

CONTROL KNOB AND INDICATOR

Filed May 8, 1926  2 Sheets-Sheet 1

Inventor:
Robert E. Wolf,

Sturtevant & Mason
Att'ys.

Nov. 20, 1928.  
R. E. WOLF  
1,692,605  
CONTROL KNOB AND INDICATOR  
Filed May 8, 1926  2 Sheets-Sheet 2
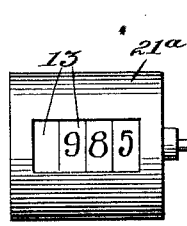
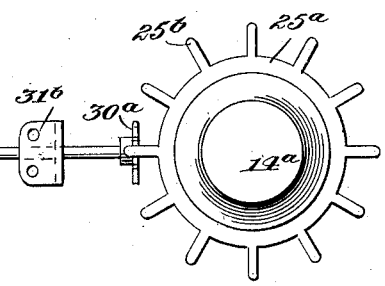
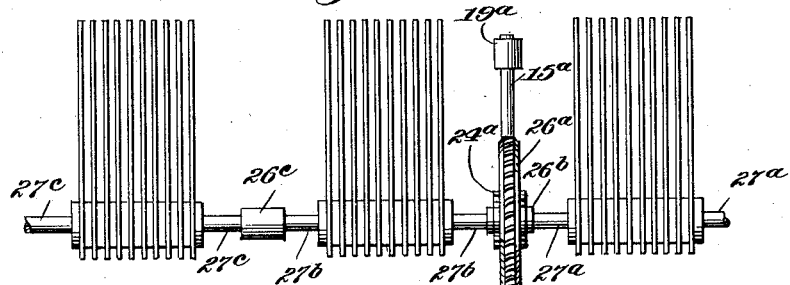
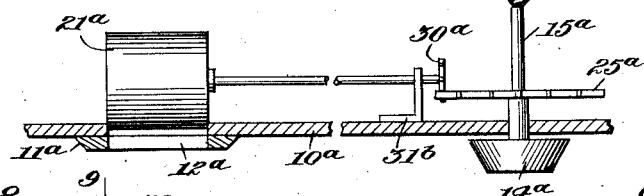
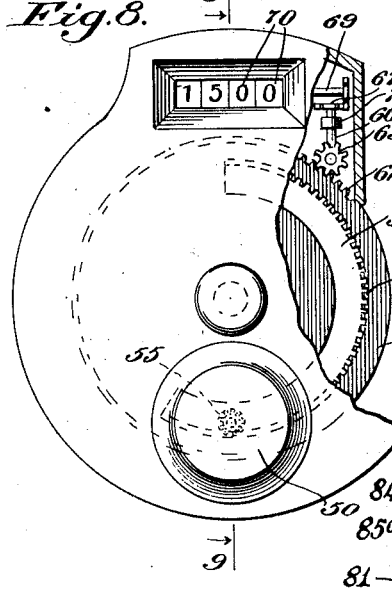
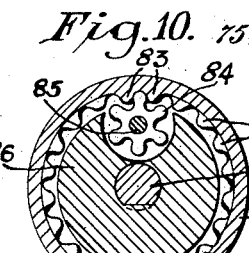
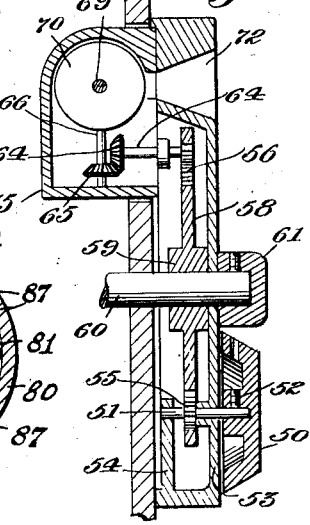
Inventor:  
Robert E. Wolf Patented Nov. 20, 1928.

1,692,605

UNITED STATES PATENT OFFICE.

ROBERT E. WOLF, OF CHICAGO, ILLINOIS.

CONTROL KNOB AND INDICATOR.

Application filed May 8, 1926. Serial No. 107,733.

This invention relates to improvements in control knobs and indicators for actuating shafts which are adapted to assume a plurality of positions, and is particularly adapted for use with the tunable elements of radio apparatus.

It has heretofore been proposed to provide knobs in conjunction with radio apparatus, which by a train of reduction gearing, secure a minute adjustment of the tunable element in a radio set. It has heretofore been customary, however, to provide a dial for giving indication of the instant position of the tunable element which was directly coupled to the shaft of the tunable element, and in conjunction with an indicator serving to designate the particular position of the respective parts. It has heretofore likewise been proposed to employ a vernier scale in conjunction with the dial scale to indicate fractional movements of lesser amount than a single scale division.

In opposition to these features in such devices, the present invention concerns the provision of a knob which is connected by a reduction train to the shaft of the tunable element, and is connected preferably by a speed-increasing train with an indicating device. In this way, a reduction of speed, and thereby a slow movement, is afforded to the shaft of the tunable element, while on the contrary the increased ratio from the knob shaft to the indicator occasions a multiplication of speed and permits the registration of very slight movements of the knob as large movements of the indicator.

In this connection, it is preferred to employ as an indicator a tachometer or disk recorder of the type usual in odometers and revolution counters. Such instruments are old and well known in the art, and are used as an example of the means of securing accurate indications of the relative positions of the shaft of the tunable element and the shaft of the knob.

This invention has been shown in several examples of execution in the illustrative presentation on the accompanying drawings, in which Figure 1 is a face view of a dial and indicator mounted upon a panel, with the reduction train shown in dotted lines.

Fig. 6 is an assembly view in elevation of a modified form of the device, with the panel removed, to show the driving train for the indicator.

Fig. 7 is a view on a smaller scale of the modified form shown in Fig. 6, employed in driving a plurality of condensers in bank.

Fig. 8 is a face view of a partial section of a further modified form.

Fig. 9 is a section on line 9—9 of Fig. 8.

Fig. 10 is a section through the transfer mechanism of the tachometer counters, substantially on line 10—10 of Fig. 11, on an enlarged scale.

Fig. 11 is a diametral section through two of these counters, on an enlarged scale.

Figure 1:
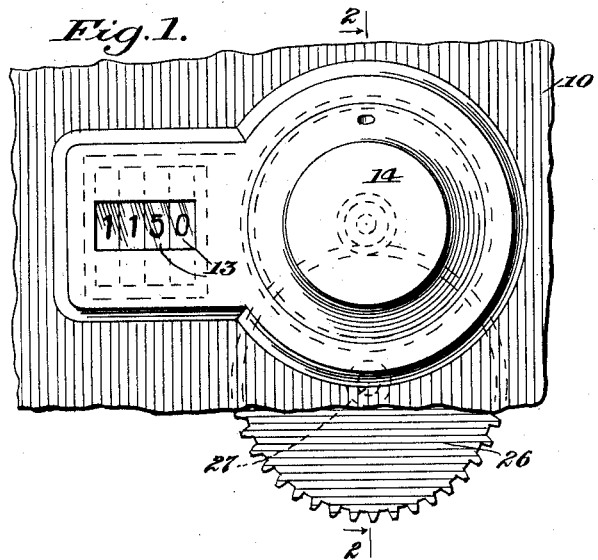

In Figs. 1 to 5 inclusive, the dial and indicator are shown mounted upon a panel 10 which may be of insulating material. The apparatus has the face plate 11 which is displayed on the outer side of the panel and which has two apertures therethrough to receive respectively the knob shaft and a window covered by a transparent plate 12 of glass for example, through which the indications of the counter wheels 13 may be observed.

The knob 14 is mounted upon a knob shaft 15 and held in invariable relation by a set screw 16 in known manner. The knob shaft 15 passes through the customary bushing 17 which is held by its enlarged end against the face plate 11, and has its other end threaded to receive the strap 18 forming a part of the rear frame of the apparatus. It will be understood that in assembling the device upon a panel, the face plate is placed in position at the front, and the rear assembly including the strap 18 at the rear of the panel, with the shaft 15 projecting through; the bushing 17 is then placed in position and is threaded home, usually by the use of a wrench on the enlarged head.

Figure 2:
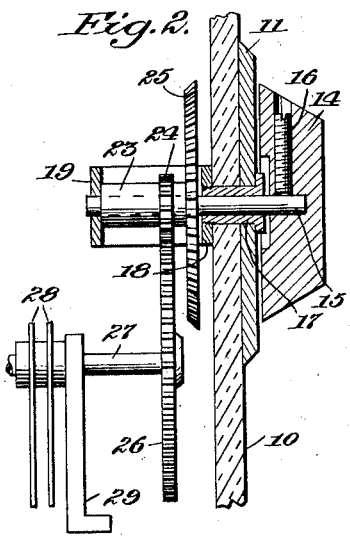
Fig. 2 is a section taken on line 2—2 of Fig. 1.
Figure 3:
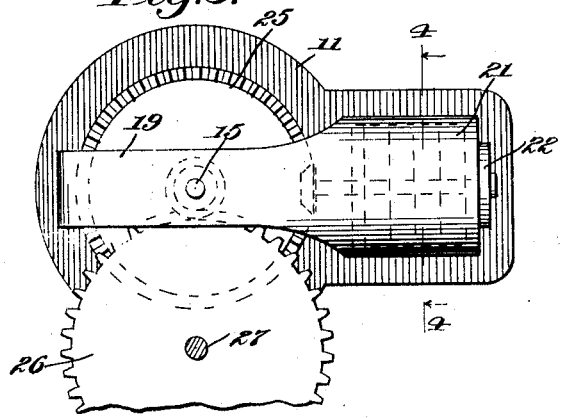
Fig. 3 is a view of the dial and indicator taken from the rear with the panel removed.
Figure 4:
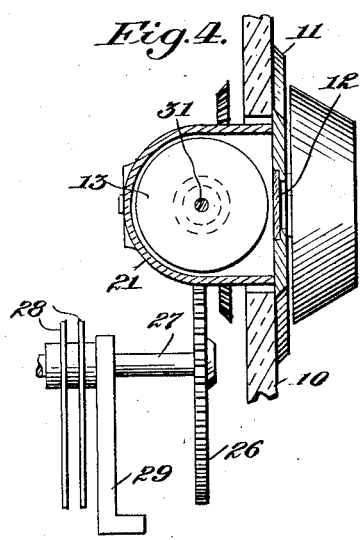
Fig. 4 is a section on line 4—4 of Fig. 3.
Figure 5:
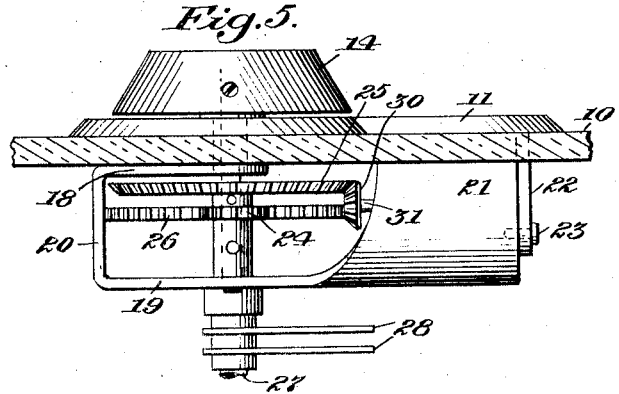
Fig. 5 is a top view of the device of Fig. 1.

The strap 18, as shown in Fig. 5, is formed integrally with the rear strap 19 to which it is connected by the angle portion 20. The rear strap 19 and the portion to the rear of the tachometer disks is folded down at the sides to form a shield 21 for these disks; and is usually folded in at the ends to enclose them against dust. A rearwardly extending bracket 22 mounted on the face plate 11 fits flush against the end of the shield 21 and may be secured thereto by screws 33 which pass through and into these elements. The shaft 15 is journaled in the bushing 17 and the rear strap 19, as shown in Fig. 2. Securely pinned to the shaft 15 to turn therewith is the bushing 23 which has the pinion teeth 24 therein and the bevel gear 25 assembled therewith. The teeth 24 are few in number, and mesh with the teeth of the large gear 26 which is keyed in an appropriate manner upon the shaft 27 of the tunable element of the radio apparatus, which is to be accurately adjusted by the rotation of the knob 14. The gear 26 may have any suitable number of teeth to afford a proper ratio between the teeth 24 and itself to secure the required sensitiveness and minuteness of adjustment.

In the particular instance here displayed, the shaft 27 is shown as belonging to a tunable instrument which in the particular instance is a variable condenser having the rotor plates 28, but it will be understood that this is merely by way of illustration. The shaft 27 in this instance is journaled in the end support 29 of this condenser.

The bevel gear 25 has a large number of teeth and drives the bevel gear 30 which is mounted on the shaft 31 of the tachometer counters. The bevel gear 30 has a very few teeth so that it is operated at a relative increase of speed with respect to the knob shaft 15. The shaft 31 is connected directly to the right hand counter disk in Fig. 1 in known manner and in one complete rotation will move this disk so that the successive indicia from 0 to 9 or vice versa are displayed. In Figs. 10 and 11 has been indicated one form of transfer system which may be employed between the respective disks. The right hand counter disk 80 in Fig. 11 is mounted for loose rotation about a stub shaft 81 which has a flat on one side. The adjacent counter disk 81 is likewise mounted. The right hand counter disk 80 is driven from the bevel gear 30 by a plate 82 so that it moves by the same angular distance as the bevel gear 30. On its left hand side in Fig. 11, the first counter disk 80 has two teeth 83 (Fig. 10) which mesh once in each revolution of the disk 80 with the transfer pinion 84 which is pivoted on the pin 85 carried by the filler plate 86 which in turn is held fixed with the shaft 81 by seating the flat thereon. The pinion 84 projects beyond the edge of the counter disk 80 into a recess formed in the right hand face of the counter disk 81. This recessed face of the disk 81 is provided with twenty teeth 87 (Fig. 10). The left hand side of the counter disk 81 is again formed with two teeth corresponding to teeth 83, to engage a second transfer pinion 84ª on the pin 85ª of the filler plate 86ª. As a result of this construction, as the right hand disk 80 completes a full revolution, its two teeth 83 cause a movement of the pinion 84 by two teeth, which causes a movement of the second counter disk 81 by two teeth, which is 2/20ths or 1/10th of a revolution of this disk, and corresponds to a transfer by one digit of the indicia upon its face. i. e., the disk 81 moves for example from "0" to "1" or from "1" to "0", according to the direction of movement of the bevel gear 30. The same action occurs between this latter disk 81 and the one to its left, etc. Such transfer mechanisms are old and well known in the art and are not claimed except as they form a part of the combination according to this invention.

The panel 10 is cut away at two points for a small round aperture to receive the bushing 17 and an oblong aperture to receive the shield 21 for the counter wheels, and it will particularly be noted that the face plate is clamped upon the panel by the employment of the single bushing 17, so that the device may be easily and quickly mounted upon or dismounted from a panel.

The device shown in Figs. 6 and 7 is but slightly modified from that already described in that it is applicable to the driving of a plurality of condensers arranged in bank with a common shaft disposed with its axis parallel to the face panel of the radio apparatus. The shield 21ª for the counting wheels 13 is substantially the same as that already described, and a shaft 31ª is provided which is of greater length than that already described at 31. This shaft is journaled by outstanding lugs 31ᵇ to the panel 10ª shown in Fig. 7. A face plate 11ª is provided for the face of the panel opposite the shield 21ª, and a window 12ª through which the counter wheels may be observed. The knob 14ª is mounted upon a shaft 15ª which carries a worm 24ª which is in mesh with a large worm gear 26ª. The worm wheel 26ª is preferably split or otherwise mounted on an insulating bushing 26ᵇ which is used to connect the several condenser shaft sections 27ª, 27ᵇ. Further insulating bushings 26ᶜ may be employed for connecting further sections 27ᶜ of the condensers to the sections 27ᵇ, 27ª already described. The shaft 15ª is suitably journaled on the bearings 19ª which are usually connected to the base-board of the radio apparatus.

The spider 25ª is rigidly keyed to the knob shaft 15ª and has a plurality of fingers 26ᵇ which engage with the driving pinion 30ª which in turn is keyed to the shaft 31ª.

The method of operation of this device is the same as that of the form already described, from which it differs partly in that the condensers or other tunable elements may be arranged in bank with the common axis parallel to the face panel, and in the further feature that the knob 14ª may be disposed at one side of the panel, while the indicator having the counter disks 13 may be disposed in a symmetrical position at the opposite end of the panel, which permits artistic design of the several parts.

In the modified form shown in Figs. 8 and 9, the knob 50 is rigidly keyed to the shaft 51 by the set screw 52 in the usual manner. The shaft 51 passes through the front and rear faces of 53 and 54 of a hollow face plate, and is journaled thereby. This shaft 51 carries a small pinion 55 which meshes with the internal teeth 56 which are cut along the edge of a slot 57 in a rear disk 58 mounted within the hollow face plate 53, 54. This disk 58 has a central hub 59 which is rigidly keyed to the driving shaft 60 of the tunable element in the radio set. For appearance, it is preferred to provide an end cap 61 which is secured to the outer end of the shaft 60 and assists in supporting the face plate 53, 54 in its proper position upon the panel.

The disk 58 is likewise formed with the external teeth 62 which mesh with the small pinion 63 carried on shaft 64 which is journaled on a lug 65 on the interior of the face plate 53, 54, and at its other end carries a bevel gear 64 which meshes with a similar bevel gear 65 mounted on the shaft 66, which at its upper end carries the driving spider 67 to cooperate with the spider 68 on the shaft 69 of the indicating device. This shaft 69 serves to drive the right hand digit wheel as before. The shaft 66 is appropriately supported by a bearing 71.

The indicator wheels 70 display their respective digits through an aperture 72 which passes through the face plate 53, 54 as shown in Fig. 9. In order to protect and support the counter wheels 70 and the shaft 66 at its bearing 71, a rear shield 75 is provided to contain them, which may be connected by any appropriate means not shown to the face plate 53, 54.

It will be seen that the panel 10$^b$ in this instance again has two apertures, one for the shaft 60 of the tunable elements, and the other a larger oblong aperture to receive the shield 75 which contains the counting wheels.

Since the presently employed frequencies at broadcasting stations range from 500 to 1500 kilocycles per second, it is preferred to so select the constants of the radio apparatus that a half or other predetermined portion of a revolution of the shaft of the tunable element will effect successive responses to waves within these frequencies, and it is particularly valuable to employ this device with four counter wheels in connection with straight line frequency condensers associated in circuits wherein the minimum capacity represents a resonance at 1500 kilocycles and the maximum capacity a resonance at 500 kilocycles, the counter wheels being set at 500 kilocycles for the maximum capacity position of the condenser and its gear trains, and adding the successive increments of rotational movement of the knob in decreasing capacity, so that the counter wheels at all times indicate exactly and directly the frequency of resonance. The three counter wheels at the left move by steps, while the right hand wheel, being directly geared, responds immediately and by a relatively large movement to any actuation of the knob in either direction. It is apparent, however, that the device is not limited solely to such employment.

It is obvious that the invention is not limited solely to the illustrations given, but may be modified within the scope of the appended claims.

I claim:

1. In a radio apparatus, a tunable element having a shaft, a knob, a speed reducing train connecting said knob and said shaft, an indicating device independent of said shaft, and a speed multiplying train connecting said knob and said indicating device whereby said knob actuates said element at a speed lower than its own and said indicating device at a speed higher than its own so that a small movement of said element corresponds to a large movement of said indicating device.

2. In a radio apparatus, a tunable element having a shaft, a face plate, a knob shaft journalled in said face plate, a knob on said knob shaft, a first gear on said knob shaft, a gear having a greater number of teeth than said first gear and fixed on said element shaft in mesh with said first gear, a counting mechanism having a shaft, a second gear on said knob shaft, and a gear having a lesser number of teeth than said second gear and fixed on said counting shaft in mesh with said second gear whereby said knob actuates said element at a speed lower than its own and said indicating device at a speed higher than its own so that a small movement of said element corresponds to a large movement of said indicating device.

3. In a knob and indicator for the shaft of a straight line frequency variable condenser employed in a tunable circuit, a knob, an indicator comprising counting wheels and transfer mechanism, means whereby said knob drives said shaft, and connections between said knob and the lowest unit of said counting wheels whereby said wheel moves with said knob, and the others of said wheels move stepwise with respect to said lowest unit wheel so that said indicators indicate directly by their divisions the resonance frequencies of the circuit containing said variable condenser.

4. In a knob and indicating apparatus, a knob, a tachometer having a plurality of counting wheels with stepwise transfer mechanisms, a speed multiplying transmission connecting said knob and the lowest unit of said tachometer, and an independent speed reducing transmission between said knob and the shaft of a variable element, whereby said knob directly drives said tachometer unit at a multiple of its own angular movement, and said shaft at a speed which is a fraction of its own angular movement.

5. In a knob and indicator apparatus, a face plate, a housing fixed to the rear of said face plate, a bridge member fixed to said housing, a knob shaft journaled in said face plate and bridge, a knob on said shaft in front of said face plate, a gear on said shaft between said face plate and bridge, tachometer counting wheels in said casing, and means whereby said gear can drive the lowest unit of said counting wheels.

6. In a knob and indicator apparatus, a face plate having a window therein, a casing connected to the rear of said face plate, tachometer counting wheels in said casing, a knob shaft passing through said face plate, a knob on said shaft in front of said plate, and connections whereby said shaft may drive the lowest unit of said counting wheels, said counting wheel being displayed through said window.

In testimony whereof, I affix my signature.

ROBERT E. WOLF.